(12) United States Patent
Dong et al.

(10) Patent No.: US 12,451,489 B2
(45) Date of Patent: Oct. 21, 2025

(54) ANODE MATERIAL, PREPARATION METHOD THEREOF AND BATTERY

(71) Applicant: BTR NEW MATERIAL GROUP CO., LTD., Gunagdong (CN)

(72) Inventors: Hang Dong, Shenzhen (CN); Daofu Zhang, Shenzhen (CN); Haihui Zhou, Shenzhen (CN); Peng He, Shenzhen (CN); Jianguo Ren, Shenzhen (CN); Youyuan Huang, Shenzhen (CN); Xueqin He, Shenzhen (CN)

(73) Assignee: BTR NEW MATERIAL GROUP CO., LTD., Shenzhen (CN)

( * ) Notice: Subject to any disclaimer, the term of this patent is extended or adjusted under 35 U.S.C. 154(b) by 0 days.

(21) Appl. No.: 19/206,435

(22) Filed: May 13, 2025

(65) Prior Publication Data
US 2025/0273679 A1  Aug. 28, 2025

(30) Foreign Application Priority Data

Sep. 30, 2024 (CN) .......................... 202411381906.2

(51) Int. Cl.
H01M 4/587 (2010.01)
H01M 4/04 (2006.01)
(Continued)

(52) U.S. Cl.
CPC ......... *H01M 4/587* (2013.01); *H01M 4/0471* (2013.01); *H01M 4/133* (2013.01);
(Continued)

(58) Field of Classification Search
None
See application file for complete search history.

(56) References Cited

U.S. PATENT DOCUMENTS

2004/0126662 A1   7/2004 Kohno et al.
2004/0137328 A1*  7/2004 Kim ................... H01M 4/133
                                            427/113
(Continued)

FOREIGN PATENT DOCUMENTS

CN   1516305 A   7/2004
CN   102341346 A  2/2012
(Continued)

OTHER PUBLICATIONS

Chinese Notification to Grant Patent Right for Invention mailed on Dec. 23, 2024, issued in Chinese Application No. 202411381906.2; 6 pages.
(Continued)

Primary Examiner — Wyatt P McConnell
(74) Attorney, Agent, or Firm — CHRISTENSEN O'CONNOR JOHNSON KINDNESS PLLC

(57) ABSTRACT

Anode material, preparation method thereof, and battery. Anode material includes graphite and carbon layer located on at least part of surface of graphite. Particle surface and particle section of anode material are respectively tested by Raman spectroscopy, peak area ratio of D characteristic peak within range of 1300 $cm^{-1}$ to 1350 $cm^{-1}$ to G characteristic peak within range of 1500 $cm^{-1}$ to 1580 $cm^{-1}$ is $I_D/I_G$, ratio of $I_D/I_G$ measured on the particle surface is A, and ratio of $I_D/I_G$ measured on particle section is B, and $1.22<A-B\le2.10$. Particle surface of anode material is tested by adopting atomic force microscopy, 1 μm×1 μm test region is randomly selected on particle surface of anode material, arithmetic average value of height deviation absolute values relative to reference surface in test region is S nm, where 15 nm≤S≤60 nm. Anode material improves lithium-ion transport kinetics, initial Coulombic efficiency, and cycle performance.

8 Claims, 7 Drawing Sheets a coating agent with an active group and a reaction regulator is dispersed in an aqueous solution, and a pre-polymerization reaction is performed to obtain a pre-polymerization solution. A polymerization degree of a polymer in the pre-polymerization solution is 3 to 30 — S10 the graphite is added into the pre-polymerization solution for liquid phase coating, and solid-liquid separation is performed to obtain a precursor. A solid-liquid ratio of the graphite to the pre-polymerization solution is 1:(1.3 to 3.5), and a mass ratio of the graphite to the coating agent is 100:(4 to 30) — S20 the precursor is carbonized to obtain a negative electrode material — S30

(51) Int. Cl.
  *H01M 4/133* (2010.01)
  *H01M 4/36* (2006.01)
  *H01M 4/62* (2006.01)
  *H01M 10/0525* (2010.01)
  *H01M 4/02* (2006.01)
(52) U.S. Cl.
  CPC ........... *H01M 4/366* (2013.01); *H01M 4/625* (2013.01); *H01M 10/0525* (2013.01); *H01M 2004/021* (2013.01); *H01M 2004/027* (2013.01)

(56) References Cited

U.S. PATENT DOCUMENTS

| | | |
|---|---|---|
| 2005/0058904 A1 | 3/2005 | Kano et al. |
| 2012/0064403 A1 | 3/2012 | Kameda et al. |
| 2012/0196193 A1 | 8/2012 | Sotowa et al. |
| 2013/0065138 A1 | 3/2013 | Takahata et al. |

FOREIGN PATENT DOCUMENTS

| | | |
|---|---|---|
| CN | 102362381 A | 2/2012 |
| CN | 113066977 A | 7/2021 |
| CN | 115394999 A | 11/2022 |
| CN | 116111074 A | 5/2023 |
| CN | 116979056 A | 10/2023 |
| CN | 117038855 A | 11/2023 |
| CN | 117254023 A | 12/2023 |
| CN | 117882216 A | 4/2024 |
| CN | 118412469 A | 7/2024 |
| CN | 118588890 A | 9/2024 |
| CN | 119092691 A | 12/2024 |
| JP | 2004079344 A | 3/2004 |

OTHER PUBLICATIONS

International Search Report mailed on Jul. 4, 2025, issued in International App. No. PCT/CN2025/084467, filed on Mar. 24, 2025; 8 pages.

Chinese Notice of Grant of Invention Patent Right mailed on Sep. 11, 2025, issued in Chinese Application No. 202510052826.0; 6 pages.

Chinese Notice of Grant of Invention Patent Right mailed on Sep. 12, 2025, issued in Chinese Application No. 202510045505.8 pages.

\* cited by examiner

ANODE MATERIAL, PREPARATION METHOD THEREOF AND BATTERY

CROSS-REFERENCE TO RELATED APPLICATIONS

This application claims priority to Chinese Patent Application No. 202411381906.2 entitled "ANODE MATERIAL, PREPARATION METHOD THEREOF AND BATTERY" filed on Sep. 30, 2024, the entire contents of which are incorporated herein by reference.

TECHNICAL FIELD

The present disclosure relates to the technical field of anode materials, and in particular, to an anode material and a battery.

BACKGROUND

The rapid development of the lithium ion batteries brings ever-changing impacts on human life. As one of the core components of lithium-ion batteries, the anode material has a significant influence on the electrochemical performance of the battery. Therefore, it is of great significance to develop a cost-effective anode material in lithium-ion battery research. Graphite-based materials are widely used as anode materials for lithium-ion batteries. However, traditional graphite-based materials still suffer from issues such as numerous surface defects and poor compatibility with electrolytes, leading to severe irreversible side reactions at the material interface during charge and discharge processes. This results in low initial Coulombic efficiency and continuous capacity degradation, severely hindering the further application of graphite-based anode materials.

Currently, the industry primarily employs surface coating methods to modify graphite, reducing direct contact between the electrolyte and natural graphite, thereby minimizing side reactions. However, the surface and interface structure of graphite materials significantly affect performance metrics such as capacity and lithium-ion transport kinetics. Existing coating processes still cannot precisely control the surface and internal interface characteristics of graphite materials, leading to poor lithium-ion transport kinetics, low capacity, and low initial efficiency.

SUMMARY

In view of this, the present disclosure provides an anode material and a battery. The anode material can comprehensively improve lithium-ion transport kinetics, initial Coulombic efficiency, while offering high capacity, low impedance, low expansion, and excellent cycle performance.

In a first aspect, the present disclosure provides an anode material including graphite and a carbon layer located on at least part of a surface of the graphite.

When a particle surface and a particle section of the anode material are respectively tested by Raman spectroscopy, a peak area ratio of D characteristic peak within a range of 1300 cm$^{-1}$ to 1350 cm$^{-1}$ to G characteristic peak within a range of 1500 cm$^{-1}$ to 1580 cm$^{-1}$ is $I_D/I_G$, a ratio of $I_D/I_G$ measured on a particle surface of the anode material is A, and a ratio of $I_D/I_G$ measured on a particle section of the anode material is B, and $1.22 < A-B \leq 2.10$.

When a particle surface of the anode material is tested by adopting an atomic force microscopy, a 1 μm×1 μm test region is randomly selected on the particle surface of the anode material, an arithmetic average value of height deviation absolute values relative to a reference surface in the test region is S nm, where 15 nm$\leq$S$\leq$60 nm, $S=1/n \sum_{i=1}^{n}|Z|$, n$\geq$5, and Z is a height deviation value of any test point in the test region relative to the reference surface.

In some embodiments, $1.70 \leq A \leq 3.00$, $0.4 \leq B \leq 0.8$.

In some embodiments, the graphite includes at least one of artificial graphite, natural graphite, and microcrystalline graphite.

In some embodiments, a fixed carbon content of the graphite is >95%.

In some embodiments, a thickness of the carbon layer is in a range of 15 nm to 250 nm.

In some embodiments, the carbon layer includes amorphous carbon.

In some embodiments, a median particle size of the anode material is in a range of 4 μm to 25 μm.

In some embodiments, a specific surface area of the anode material is $\leq 6$ μm$^2$/g.

In some embodiments, a tap density of the anode material is in a range of 0.75 g/cm$^3$ to 1.3 g/cm$^3$.

In some embodiments, an oil absorption value of the anode material is 38 mL/100 g to 48 mL/100 g.

In a second aspect, the present disclosure provides a battery, the battery includes the above anode material or the anode material prepared by the above preparation method.

The technical solutions of the present disclosure have at least the following beneficial effects.

In the anode material provided in the present disclosure, the Raman ratio A of the particle surface of the anode material can be used to characterize the disorder degree of the carbon layer, and the Raman ratio B of the particle section of the anode material can be used to characterize the crystallization degree and mass of the graphite. In the research process, the Applicant of the present disclosure finds that when A-B is too small, the Raman ratio of the particle surface to the particle interior of the anode material become too close, indicating that the Raman ratio A of the carbon layer is too small or the Raman ratio B of the section of the anode material is too high, resulting in insufficient disorder degree of the carbon layer or insufficient crystallinity of graphite, and thus leading poor rate performance and low capacity of the anode material. When A-B is too large, the Raman ratio difference between the particle surface and the particle interior of the anode material is too large, the kinetic transmission performance difference between the connection interface of the graphite and carbon layer is large, thereby the increasing the impedance of the anode material, and thus deteriorating the rate performance of the anode material. A-B and S are controlled within the above ranges, so that the Raman ratio difference value between the particle surface of the anode material and the interior surface of the particle, and the flatness of the coating layer are within a proper range, thereby ensuring the regularity of the internal graphite structure and the high disorder of the external coating layer structure, effectively improving the electrolyte infiltration and improving the interface transport kinetics of the anode material, so that the anode material has excellent performance of high capacity, low impedance, high rate and high initial efficiency.

In addition, the Applicant of the present disclosure finds that the microstructure of the particle surface of the anode material is closely related to the properties of material capacity, initial efficiency and the like in the research process, and uses an atomic force microscope to test that the arithmetic average value of the absolute value of the height deviation measured relative to the reference surface in the scanning region is S nm. When satisfying 15≤S≤60, the anode material has high capacity, high initial efficiency and low interface impedance characteristics. The Applicant finds that S is controlled within a range of 15 nm to 60 nm, and then the coating layer on the surface of the anode material is uniformly distributed on the surface of the graphite particle, and meanwhile, the roughness of the coating layer is also within a suitable range, which is conducive to electrolyte infiltration and interface impedance reduction. When S<15 nm, the surface of the anode material is too flat and smooth, which is not conducive to the electrolyte infiltration, resulting in reduction of the capacity of the anode material. When S>60 nm, the surface roughness of the anode material is too high, and the electrolyte infiltration is enhanced. However, because the uniformity of the coating layer on the surface of the anode material is reduced, thereby increasing the interfacial side reactions of the anode material and the irreversible consumption of active lithium ions, and thus reducing the initial efficiency of the anode material.

According to the present disclosure, A-B and S are controlled within the above ranges, so that the Raman ratio difference value between the particle surface of the anode material and the interior surface of the particle, and the flatness of the coating layer are within a proper range, thereby ensuring the regularity of the internal graphite structure and the high disorder of the external coating layer structure, and the uniform distribution and the proper morphology flatness of coating layer of the graphite surface. Therefore, the anode material provided by the present disclosure can effectively improve the electrolyte infiltration and improve the interface transport kinetics of the anode material, so that the anode material has excellent performance of high capacity, low impedance, high rate and high initial efficiency.

DESCRIPTION OF EMBODIMENTS

Figure 1:
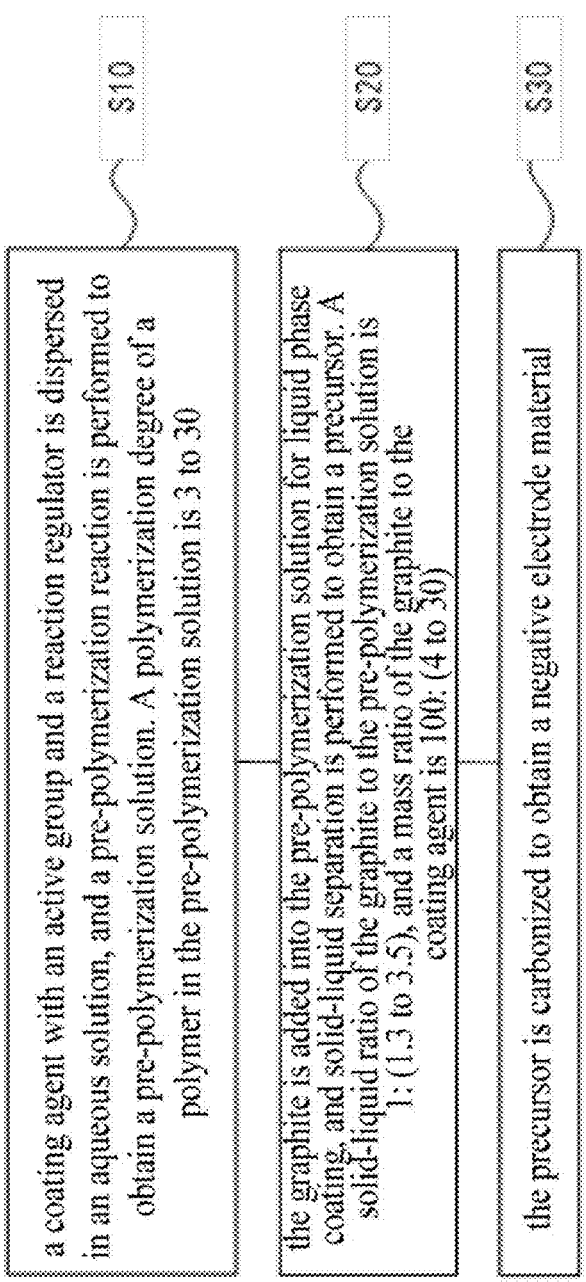
FIG. 1 is a process flow chart of a preparation method of an anode material provided by the present disclosure.

In order to better explain the present disclosure and facilitate the understanding of the technical solutions of the present disclosure, the present disclosure will be further described in details below. However, the following embodiments are merely simple examples of the present disclosure and are not intended to represent or limit the scope of protection of the present disclosure.

Based on this, in a first aspect, the present disclosure provides an anode material including graphite and a carbon layer located on at least part of a surface of the graphite.

A particle surface and a particle section of the anode material are respectively tested by Raman spectroscopy, and a peak area ratio of D characteristic peak within a range of 1300 cm$^{-1}$ to 1350 cm$^{-1}$ to G characteristic peak is within a range of 1500 cm$^{-1}$ to 1580 cm$^{-1}$ is $I_D/I_G$, a ratio of $I_D/I_G$ measured on a particle surface of the anode material is A, and a ratio of $I_D/I_G$ measured on a particle section of the anode material is B, and 1.22<A-B≤2.10.

When a particle surface of the anode material is tested by adopting an atomic force microscopy, and a 1 μm×1 μm test region is randomly selected on the particle surface of the anode material, an arithmetic average value of height deviation absolute values relative to a reference surface in the test region is S nm, where 15 nm≤S≤60 nm, $$S = \frac{1}{n}\sum_{i=1}^{n}|Z|,$$

n≥5 and Z is a height deviation value of any test point in the test region relative to the reference surface. In the anode material provided in the present disclosure, the Raman ratio A of the particle surface of the anode material can be used to characterize the disorder degree of the carbon layer, and the Raman ratio B of the particle section of the anode material can be used to characterize the crystallization degree and mass of the graphite. In the research process, the Applicant of the present disclosure finds that when A-B is too small, the Raman ratio of the particle surface to the particle interior of the anode material become too close, indicating that the Raman ratio A of the carbon layer is too small or the Raman ratio B of the section of the anode material is too high, resulting in insufficient disorder degree of the carbon layer or insufficient crystallinity of graphite, and thus leading poor rate performance and low capacity of the anode material. When A-B is too large, the Raman ratio difference between the particle surface and the particle interior of the anode material is too large, the kinetic transmission performance difference between the connection interface of the graphite and carbon layer is large, thereby increasing the impedance of the anode material, and thus deteriorating the rate performance of the anode material.

According to the present application, A-B and S are controlled within the above ranges, so that the Raman ratio difference value between the particle surface of the anode material and the interior surface of the particle, and the flatness of the coating layer are within a proper range, thereby ensuring the regularity of the internal graphite structure and the high disorder of the external coating layer structure, effectively improving the electrolyte infiltration and improve the interface transport kinetics of the anode material, so that the anode material has excellent performance of high capacity, low impedance, high rate and high initial efficiency.

In addition, the Applicant of the present disclosure finds that the particle surface is closely related to the properties of material capacity, initial efficiency and the like in the research process, and uses an atomic force microscope to test that the arithmetic average value of the absolute value of the height deviation measured relative to the reference surface in the scanning region is S nm. S can specifically be 15 nm, 20 nm, 25 nm, 30 nm, 35 nm, 40 nm, 45 nm, 50 nm, or 60 nm, and can certainly be other values within the above range, which is not limited here. When satisfying 15 nm≤S≤60 nm, the anode material has characteristics of high capacity, high initial efficiency, and low interface impedance characteristics. The Applicant finds that S is controlled within a range of 15 nm to 60 nm, and then the coating layer on the surface of the anode material is uniformly distributed on the surface of the graphite particle, and meanwhile, the roughness of the coating layer is also within a suitable range, which is conducive to electrolyte infiltration and interface impedance reduction. When S<15 nm, the surface of the anode material is too flat and smooth, which is not conducive to the electrolyte infiltration, resulting in reduction of the capacity of the anode material. When S>60 nm, the surface roughness of the anode material is too high, and the electrolyte infiltration is enhanced. However, because the uniformity of the coating layer on the surface of the anode material is reduced, thereby increasing the interfacial side reactions of the anode material and the irreversible consumption of active lithium ions, and thus reducing the initial efficiency of the anode material. According to the present disclosure, A-B and S are controlled within the above ranges, so that the Raman ratio difference value between the particle surface of the anode material and the interior surface of the particle, and the flatness of the coating layer are within a proper range, thereby ensuring the regularity of the internal graphite structure and the high disorder of the external coating layer structure, and the uniform distribution and the proper morphology flatness of coating layer of the graphite surface. The former helps to improve the rate performance and capacity of the anode material, while the latter helps to improve the initial efficiency and capacity of the anode material. Therefore, the anode material provided by the present disclosure can effectively improve the electrolyte infiltration and improve the interface transport kinetics of the anode material, so that the anode material has excellent performance of high capacity, low impedance, high rate and high initial efficiency.

In some embodiments, 1.70≤A≤3.00, which may specifically be 1.7, 1.8, 1.9, 2.0, 2.1, 2.2, 2.3, 2.5, 2.8, or 3.0, and may be other values within the foregoing range, which is not limited herein. In the present disclosure, the A value is controlled within the above range, the carbon layer has a high degree of structural disorder, which can improve the infiltration of the contact interface between the surface of the anode material and the electrolyte, reduce the occurrence of interfacial side reactions of the anode material, reduce the consumption of irreversibly active lithium ions, improve the lithium ion transmission power, reduce the interfacial impedance of the contact interface, and improve the initial Coulombic efficiency and electrochemical performance of the anode material.

In some embodiments, 0.4≤B≤0.8, which may specifically be 0.4, 0.5, 0.55, 0.58, 0.6, 0.7, 0.75, or 0.8, and may be other values within the foregoing range, which is not limited herein. According to the present disclosure, the B value is controlled within the above range, the graphitization degree of the graphite is proper, the structure regularity of the graphite is good, the interface impedance of the connection interface between the graphite and the carbon layer can be controlled within a proper range, thereby improving the capacity and the initial Coulombic efficiency of the anode material.

In some embodiments, the specific value of A-B may specifically be 1.26, 1.3, 1.5, 1.6, 1.8, 1.9, 2.0, 2.05, or 2.1, and may be other values within the foregoing range, which is not limited herein.

In some embodiments, the graphite includes at least one of artificial graphite, natural graphite, and microcrystalline graphite. Natural graphite is flake graphite. The natural graphite is natural crystalline graphite shaped like fish phosphorus and belonging to a hexagonal crystal system with a layered structure It has good properties such as high temperature resistance, electric conductivity, heat conduction, lubrication, plasticity, acid and alkali resistance. Artificial graphite is graphite material obtained by carbonizing an organic matter and then performing graphitization high-temperature treatment.

In some embodiments, the graphite includes spherical graphite. The spherical graphite is natural graphite.

In some embodiments, the mass content of carbon in the graphite is ≥95%, and may specifically be 95%, 96%, 97%, 97.5%, 98.3%, 98.8%, or 99%, but is not limited to the recited values, and other unrecited values within the numerical range are also applicable. In an embodiment, the mass content of the carbon in the graphite is ≥99%.

In some embodiments, the thickness of the carbon layer is 15 nm to 250 nm, and may specifically be 15 nm, 20 nm, 30 nm, 40 nm, 50 nm, 80 nm, 100 nm, 150 nm, 200 nm, 220 nm or 250 nm, but is not limited to the recited values, and other unrecited values within the numerical range are also applicable. The thickness of the carbon layer is controlled within the above range, which is beneficial to improving the lithium ion transmission power of the anode material, thereby reducing the side reaction between the anode material and the electrolyte, and thus improving the initial Coulombic efficiency.

In some embodiments, the carbon layer includes amorphous carbon and graphitized carbon. The carbon layer has good compatibility with the electrolyte, ensuring the stability of the electrical performance of the anode material during charging and discharging.

In some embodiments, a specific surface area of the anode material is ≤6 $\mu m^2/g$, and may specifically be 1.0 $\mu m^2/g$, 1.8 $\mu m^2/g$, 2.6 $\mu m^2/g$, 3.5 $\mu m^2/g$, 5.0 $\mu m^2/g$ or 6.0 $\mu m^2/g$, and may also certainly be other numbers within the above range, which is not limited herein. The specific surface area of the anode material is controlled within the above range, which is beneficial to improving the cycle performance of the battery made of the anode material.

In some embodiments, a median particle size of the anode material is in a range of 4 μm to 25 μm, and more specifically, may be 4 μm, 6 μm, 8 μm, 9 μm, 10 μm, 12 μm, 14 μm, 15 μm, 17 am, 20 am, 22 μm or 25 am, but not limited to the recited values, and other unrecited values within the numerical range are also applicable.

In some embodiments, a tap density of the anode material is in a range of 0.75 $g/cm^3$ to 1.3 $g/cm^3$, and can specifically be 0.75 $g/cm^3$, 0.8 $g/cm^3$, 0.85 $g/cm^3$, 0.9 $g/cm^3$, 0.92 $g/cm^3$, 1.0 $g/cm^3$, 1.05 $g/cm^3$, 1.1 $g/cm^3$, 1.15 $g/cm^3$, 1.2 $g/cm^3$, 1.25 $g/cm^3$ or 1.3 $g/cm^3$, and may also be other numbers within the above range, which is not limited herein. The tap density of the anode material in the present disclosure is controlled within the foregoing range, which is beneficial to improving the energy density of the lithium ion battery made of the anode material.

In some embodiments, an oil absorption value of the anode material is in a range of 38 mL/100 g to 48 mL/100 g, and may specifically be 38 mL/100 g, 39 mL/100 g, 40 mL/100 g, 41 mL/100 g, 42 mL/100 g, 43 mL/100 g, 44 mL/100 g, 45 mL/100 g or 48 mL/100 g, and may also be other values within the above range, which is not limited herein. According to the anode material, the structural disorder degree of the carbon layer is high, the oil absorption value of the anode material can be controlled within the above range, thereby improving the infiltration of the contact interface between the surface of the anode material and the electrolyte and the lithium ion transmission power, and thus reducing the interface impedance of the contact interface.

In a second aspect, an embodiment of the present disclosure provides a preparation method of an anode material, as shown in FIG. 1, including the following steps:

Step S10: a coating agent with an active group and a reaction regulator is dispersed in an aqueous solution, and a pre-polymerization reaction is performed to obtain a pre-polymerization solution. A polymerization degree of a polymer in the pre-polymerization solution is 3 to 30.

Step S20: the graphite is added into the pre-polymerization solution for liquid phase coating, and solid-liquid separation is performed to obtain a precursor. A solid-liquid ratio of the graphite to the pre-polymerization solution is 1:(1.3 to 3.5), and a mass ratio of the graphite to the coating agent is 100:(4 to 30).

Step S30: the precursor is carbonized to obtain an anode material.

In the present disclosure, by pre-polymerizing the coating agent with the active group, the polymerization degree of polymer molecules in the obtained pre-polymerization solution is within the range of 3-30. The polymer is mainly an oligomer, with small molecular chain, and can be uniformly dispersed in the pre-polymerization solution. Graphite is added to the pre polymerization solution for liquid-phase coating. In the coating process, the polymer uniformly dispersed in the pre polymerization solution can deposit and adhere to the surface of graphite particles, to form a uniform polymer coating layer. Meanwhile, by controlling the solid-liquid ratio of the graphite to the pre-polymerization solution to be 1:(1.3 to 3.5), the thickness of the polymer coating layer uniformly attached to the surface of the graphite is within a proper range, which not only increases the capacity of the anode material but also enhances the lithium ion interface transport efficiency of the anode material. Finally, through carbonization treatment, the polymer coating layer can be fully carbonized to form a carbon layer, the disordered degree of the carbon material in the carbon layer is high, the difference in the Raman ratio of the surface of the anode material particle to the interior of the anode material particle can also be within a suitable range. In addition, the flatness of the material surface coating can also be within an appropriate range. The above preparation method not only ensures the regularity of the graphite structure inside the anode material particles, but also provides better transmission power at the interface between graphite and carbon layer, and improves the infiltration of the contact interface between the surface of anode material and the electrolyte. The anode material prepared by the preparation method of the present disclosure can possess excellent lithium-ion transmission power performance, capacity, initial Coulombic efficiency and cycle performance.

The preparation method provided in this solution is described in details as below.

Step S10: a coating agent with an active group and a reaction regulator is dispersed in an aqueous solution, and a pre-polymerization reaction is performed to obtain a pre-polymerization solution. A polymerization degree of a polymer in the pre-polymerization solution is 3 to 30.

In some embodiments, the degree of polymerization of the polymer in the pre-polymerization solution is in the range of 3-30, and may be 3, 5, 10, 15, 20, 25, 30, or the like. When the polymerization degree of the pre-polymerization molecule is relatively low, the utilization rate of the coating agent is reduced, resulting in the direct waste of free coating agent that has not been polymerized and deposited in the solid-liquid separation stage, and thus increasing the production cost. When the polymerization degree of the pre-polymerization molecule is relatively high, the disorder degree of the final coating agent polymerization deposition layer is reduced, resulting in a decrease in the Raman value of the final anode material, which is not conducive to improving the kinetic performance.

In some embodiments, the active group includes at least one of a carbon-carbon double bond, a carboxyl group, a hydroxyl group and an amine group.

In some embodiments, the coating agent with the active group comprises at least one of the following: styrene, fluorostyrene, bromostyrene, aminostyrene, Phenylacetic acid, phenylpropionic acid, aniline, phenylenediamine, acrylic acid, methyl acrylate, ethyl acrylate, phenyl acrylate, benzyl acrylate, acrylamide, methylacrylamide, ethylacrylamide, phenylacrylamide, maleic acid, maleic anhydride, maleic diamine, citric acid, mesaconic acid, itaconic acid, itaconic anhydride, sulfamic acid, ammonium sulfamate, benzoic acid, ammonium benzoate, and p-fluorobenzoic acid.

In some embodiments, the reaction regulator includes at least one of a redox agent and a pH regulator.

In some embodiments, the redox agent includes at least one of azobisisobutyronitrile, azobisisovaleronitrile, hydrogen peroxide, ammonium persulfate, sodium persulfate, potassium persulfate, aluminum chloride, and ferric chloride.

In some embodiments, the pH adjusting agent includes at least one of sodium hydroxide, potassium hydroxide, aqueous ammonia, sodium carbonate, hydrochloric acid, sulfuric acid, phosphoric acid, nitric acid, and acetic acid.

In some embodiments, the coating agent includes a coating agent with an amine group, which may be at least one of aminostyrene, aniline, benzenediamine, acrylamide, methacrylamide, ethylacrylamide, phenylacrylamide, maleic diamine, sulfamic acid, ammonium sulfamate, and ammonium benzoate.

In some embodiments, the coating agent includes a coating agent with an amine group, the reaction regulator includes a pH regulator, and the pH regulator includes at least one of sodium hydroxide, potassium hydroxide, aqueous ammonia, sodium carbonate, hydrochloric acid, sulfuric acid, phosphoric acid, nitric acid, and acetic acid.

In some embodiments, the pH value of the pre-polymerization reaction is controlled to be in a range of 4-7, and may specifically be 4, 4.5, 5, 5.5, 6, 6.5 or 7, and may certainly be other values within the above range, which is not limited herein. When the pH value of the pre-polymerization reaction is high, the pre-polymerization degree of the coating agent will be affected, resulting in a low disorder degree of the polymer deposition layer deposited on the graphite surface, and finally affecting the A value of the anode material. When the pH value of the pre-polymerization reaction is low, the pre-polymerization reaction is insufficient, most of the coating agent remains free in solution, and the polymer deposited on the graphite surface is insufficient.

In some embodiments, the coating agent includes a coating agent with an amine group, the reaction regulator further includes a redox agent, and the redox agent includes at least one of azobisisobutyronitrile, azobisisovaleronitrile, hydrogen peroxide, ammonium persulfate, sodium persulfate, potassium persulfate, aluminum chloride, and ferric chloride. The addition of the redox agent may facilitate the prepolymerization reaction of the coating agent with active group.

In some embodiments, the coating agent includes a coating agent with a carbon-carbon double bond, which may specifically be acrylic acid, methyl acrylate, ethyl acrylate, phenyl acrylate, benzyl acrylate, etc. The temperature of the pre polymerization reaction is 40° C. to 70° C., and may specifically be 40° C., 45° C., 50° C., 55° C., 60° C., 65° C., or 70° C., and may certainly be other values within the above range, which is not limited herein. The temperature of the pre-polymerization reaction is controlled within the above range, so that the coating agent can be fully pre-polymerization. When a temperature of the pre-polymerization reaction is too high, the pre-polymerization degree of the coating agent is too high, resulting in uneven polymer coating on the surface of the graphite. When a temperature of the pre-polymerization reaction is too low, the pre-polymerization degree of the coating agent is too low, the oligomer is difficult to uniformly deposit and adhere to the surface of the graphite, resulting in waste of the coating agent.

In some embodiments, a mass ratio of the redox agent to the coating agent is 1:(0.7 to 2.0), and may specifically be 1:0.7, 1:0.9, 1:1.0, 1:1.1, 1:1.2, 1:1.5, 1:1.7, 1:1.9, or 1:2.0, the like, and certainly, and may also be other values within the above ranges, which is not limited herein. Insufficient addition of redox agent can affect the pre-polymerization degree of the coating agent, resulting in a low disorder degree of the polymer deposition layer deposited on the graphite surface, and finally affecting the A value of the carbon layer of the anode material. When the addition amount of the redox agent is too high, the polymerization rate of the coating agent is too fast, resulting in uneven distribution of the coating agent on the graphite surface, and excessive redox agent can also increase the production cost.

In some embodiments, the time of the pre-polymerization reaction is controlled to be in a range of 1 h to 4 h, and may specifically be 1 h, 1.5 h, 2 h, 2.5 h, 3 h, 3.5 h or 4 h, and may certainly be other values within the above range, which is not limited herein. The short duration of the pre-polymerization reaction leads to a low content of the pre-polymerization polymer in the pre-polymerization solution, resulting in insufficient pre-polymerization reaction. The time of the pre-polymerization reaction is too long, thereby reducing the production efficiency, which is not conducive to industrial preparation.

Step S20: the graphite is added into the pre-polymerization solution for liquid phase coating, and solid-liquid separation is performed to obtain a precursor. A solid-liquid ratio of the graphite to the pre-polymerization solution is 1:(1.3 to 3.5), and a mass ratio of the graphite to the coating agent is 100:(4 to 30).

In some embodiments, the graphite includes at least one of artificial graphite and natural graphite. The natural graphite is flake graphite or spherical graphite prepared by shaping the flake graphite. The natural graphite is natural crystalline graphite shaped like fish phosphorus and belonging to a hexagonal crystal system with a layered structure It has good properties such as high temperature resistance, electric conductivity, heat conduction, lubrication, plasticity, acid and alkali resistance. Artificial graphite is graphite material obtained by carbonizing an organic matter and then performing graphitization high-temperature treatment.

In some embodiments, the graphite includes spherical graphite. The spherical graphite is natural graphite.

In some embodiments, a median particle size of the graphite is in a range of 1 μm to m, and more specifically, may be 1 μm, 5 μm, 8 μm, 10 μm, 11 μm, 13 μm, 16 μm, 18 μm, 20 m, 23 μm, 26 μm or 30 μm, but is not limited to the recited values, and other unrecited values within the numerical range are also applicable. It is found through multiple tests that the median particle size of graphite is controlled within the above range, which is beneficial to reducing the specific surface area of the graphite, thereby reducing the contact between graphite and electrolyte, and thus inhibiting side reactions. In an embodiment, a median particle size of the graphite is in a range of 5 μm to 20 km.

In some embodiments, the mass content of carbon in the graphite is ≥95%, and may specifically be 95%, 96%, 97%, 97.5%, 98.3%, 98.8%, or 99%, but is not limited to the recited values, and other unrecited values within the numerical range are also applicable. In an embodiment, the mass content of the carbon in the graphite is ≥99%.

In some embodiments, a solid-liquid ratio of the graphite to the pre-polymerization solution is 1:(1.3 to 3.5) g/mL, and may specifically be 1:1.3 g/mL, 1:1.5 g/mL, 1:1.8 g/mL, 1:1.9 g/mL, 1:2.0 g/mL, 1:2.5 g/mL, 1:3.0 g/mL, or 1:3.5 g/mL, but is not limited to the recited values, and other unrecited values within the numerical range are also applicable. In the present disclosure, controlling a solid-liquid ratio of the graphite to the pre-polymerization solution within the above range can control the concentration of polymer molecules in the pre-polymerization solution per unit volume, thereby ensuring that the thickness of the polymer coating layer uniformly attached to the graphite surface is within a suitable range, and thus improving the lithium ion interface transmission efficiency of the anode material while improving the capacity of the anode material. When the solid-liquid ratio is too high, the addition amount of graphite is too much, the polymer in the pre-polymerization solution is insufficient, making it difficult to ensure that a polymer coating layer with a uniform thickness is formed on the surface of the graphite particles, thereby hindering the interface transmission of the anode material, and thus influencing the capacity of the anode material. When the solid-liquid ratio is too low, the addition amount of the graphite is too small, the polymer coating layer on the surface of the graphite particles is too thick, thereby reducing the capacity of the anode material.

In some embodiments, a mass ratio of the graphite to the coating agent is 100:(4 to 30), and may specifically be 100:4, 100:5, 100:8, 100:10, 100:15, 100:20, 100:25 or 100:30, and certainly, may also be other values within the above range, which is not limited herein. When the addition amount of the coating agent is too small, it is difficult to deposit a uniform polymer coating layer on the graphite surface. When the addition amount of the coating agent is too much, the thickness of the polymer coating layer deposited on the graphite surface is too large, thereby hindering the interface transmission of the anode material, and thus influencing the capacity of the anode material.

In some embodiments, time of the liquid phase coating is in a range of 4 h to 24 h, and can specifically be 4 h, 5 h, 8 h, 10 h, 15 h, 18 h, 20 h, 23 h, or 24 h. When the liquid-phase coating time is insufficient, polymer molecules in the pre-polymerization solution are difficult to fully deposit and adhere to the surface of graphite particles, and the coating layers on the graphite surface are unevenly distributed.

When the liquid phase coating time is too long, the production efficiency is reduced, which is not conducive to industrial preparation.

In some embodiments, the liquid phase coating is performed under stirring, and a polymer formed by polymerizing a coating agent with the active group is deposited and adhered to the surface of the graphite.

According to the present disclosure, by controlling the solid-liquid ratio and time of liquid phase coating, the addition amount of the coating agent and the like, the polymer formed by the coating agent with the active group can be promoted to be uniformly deposited and adhered to the surface of the graphite under the stirring state.

In some embodiments, after liquid phase coating, solid-liquid separation is performed on the mixed solution to obtain a solid and dry it, thereby obtaining the precursor.

In some embodiments, the solid-liquid separation includes at least one of suction filtration, centrifugation, and natural volatilization.

In some embodiments, the drying treatment includes at least one of blast drying, vacuum drying, freeze drying and spray drying.

S30: the precursor is carbonized to obtain an anode material.

In some embodiments, a temperature of the carbonization treatment is in a range of 1000° C. to 2300° C., and may specifically be 1000° C., 1300° C., 1500° C., 1800° C., 1900° C., 2000° C., 2200° C., or 2300° C., but is not limited to the recited values, and other unrecited values within the numerical range are also applicable. When the temperature of the carbonization treatment is relatively low, the Raman value of the carbon layer of the anode material is relatively high, that is, the degree of disorder of the carbon layer is relatively high, resulting in increased interfacial side reactions, and reduced initial efficiency of the anode material. When the temperature of the carbonization treatment is too high, the Raman value of the carbon layer of the anode material is relatively low, that is, the disorder degree of the carbon layer is relatively low, resulting in poor interfacial transport kinetics.

In some embodiments, a heat preservation time of the carbonization treatment is in a range of 0.5 h to 6 h, and may specifically be 0.5 h, 1 h, 2 h, 3 h, 4 h, 5 h, or 6 h, but is not limited to the recited values, and other unrecited values within the numerical range are also applicable.

In some embodiments, the carbonization treatment is performed under a protective atmosphere including at least one of nitrogen, helium, neon, argon, krypton, and xenon.

Figure 2:
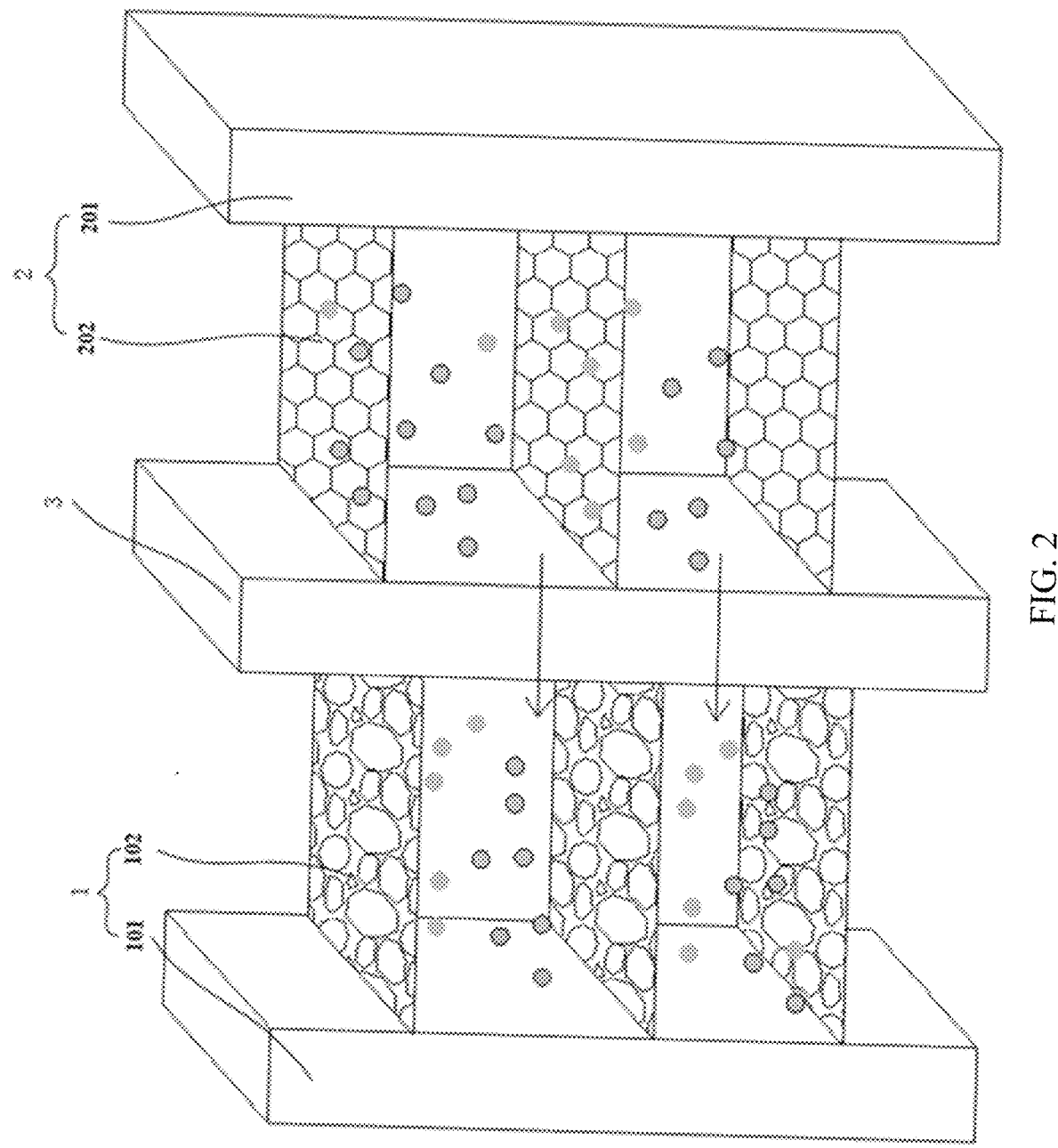
FIG. 2 is a schematic diagram of a discharging state of a battery according to an embodiment of the present disclosure.

An embodiment of the present disclosure further provides a battery, FIG. 2 is a schematic diagram of a discharging state of a battery according to an embodiment of the present disclosure. As shown in FIG. 2, the battery includes a housing and an electrode assembly. The electrode assembly includes a positive electrode plate 1, a negative electrode plate 2, and a separator 3, and the separator 3 is arranged between the positive electrode plate 1 and the negative electrode plate 2. The electrode assembly may be a laminated structure, which is formed by alternately sequentially laminating the positive electrode plate 1, the separator 3 and the negative electrode plate 2. In other embodiments, the electrode assembly may also be a rolling structure, which is formed by sequentially laminating the positive electrode plate, the separator and the negative electrode plate and then rolling.

In some embodiments, the positive electrode plate 1 includes a positive electrode current collector 101 and a positive electrode active layer 102 arranged on at least one surface of the positive electrode current collector 101.

In some embodiments, the positive electrode current collector 101 can be made of aluminum foil or nickel foil, or any composite current collector disclosed in the related art, such as but not limited to the current collector formed by combining the above conductive foil (aluminum foil or nickel foil, or the like) with the polymer substrate. The positive active layer 102 includes a positive electrode active material. The positive electrode active material includes compounds reversibly intercalating and deintercalating metal ions.

In some embodiments, the positive electrode active material may include lithium transition metal composite oxide, sodium transition metal composite oxide, or the like. The lithium transition metal composite oxide contains lithium and at least one element selected from cobalt, manganese and nickel.

In some embodiments, the positive electrode active material may include, but is not limited to, at least one of lithium cobalt oxide ($LiCoO_2$), lithium nickel manganese cobalt ternary material (NCM), lithium manganate oxide ($LiMn_2O_4$), lithium nickel manganate oxide ($LiNi_{0.5}Mn_{1.5}O_4$), or lithium iron phosphate ($LiFePO_4$).

In some embodiments, the negative electrode plate 2 includes a negative electrode current collector 201 and a negative active material layer 202 arranged on at least one surface of the negative electrode current collector.

In some embodiments, the negative electrode current collector 201 may be at least one of copper foil, nickel foil, stainless steel foil, titanium foil, or carbon-based current collector, and may also be any composite current collector disclosed in the related art, such as but not limited to the current collector formed by combining the above conductive foil and polymer substrate. The negative active material layer 202 includes an anode material. The anode material is the anode material according to the above first aspect or the anode material prepared by the above preparation method.

The battery provided by an embodiment of the present disclosure has the advantages of high capacity, high initial efficiency, long cycle service life, excellent rate performance and low expansion. The battery may be a lithium-ion battery, a sodium-ion battery, or a solid-state electrolyte battery, which is not limited herein.

The present disclosure is further described below by multiple embodiments. Embodiments of the present disclosure are not limited to the specific embodiments described as below. Variations may be made appropriately without changing the scope of the independent claims.

The embodiments of the present disclosure are further described below through multiple embodiments. The embodiments of the present disclosure are not limited to the following specific embodiments. Within the scope of protection, changes may be implemented appropriately.

Embodiment I (1) 7 parts of phenylenediamine were mixed with an appropriate amount of pure water. The pH of the solution was adjusted to 4 with 0.5 μmol/L phosphoric acid solution. 7 parts of 1 mol/L ammonium persulfate solution were added to establish an oxidative environment. The mixture was stirred continuously for 1 h to initiate pre-polymerization reaction, obtaining a pre-polymerization solution.

(2) The pre-polymerization solution, 100 parts of graphite (average particle size is 17 μm), and an appropriate amount of pure water were stirred and mixed at a solid-to-liquid ratio of 1:3 to form a homogeneous mixture. The mixture was performed liquid-phase coating for 12 h under stirring. Polyphenylenediamine in the pre-polymerization solution was deposited and adhered to a surface of graphite particle. Then the mixture was centrifuged, and the centrifuged product was dried at 120° C. for 36 h in an oven, obtaining a precursor.

(3) Under a nitrogen atmosphere, the precursor was heated to 1250° C. and carbonized for 4 h. Then the product was cooled naturally to room temperature, obtaining a final anode material.

Embodiment 2

Different from Embodiment 1:
(1) 7 parts of aminostyrene were mixed with an appropriate amount of pure water. The pH of the solution was adjusted to 4 with 0.5 µmol/L phosphoric acid solution. 7 parts of 1 mol/L ammonium persulfate solution were added to establish an oxidative environment. The mixture was stirred continuously for 1 h to initiate pre-polymerization reaction.

Embodiment 3

Different from Embodiment 1:
(1) 7 parts of phenylenediamine were mixed with an appropriate amount of pure water. The pH of the solution was adjusted to 5 with 0.5 µmol/L phosphoric acid solution. 7 parts of 1 mol/L ammonium persulfate solution were added to establish an oxidative environment. The mixture was stirred continuously for 1 h to initiate pre-polymerization reaction.

Embodiment 4

Different from Embodiment 1:
(1) 7 parts of phenylenediamine were mixed with an appropriate amount of pure water. The pH of the solution was adjusted to 7 with 0.5 µmol/L phosphoric acid solution. 7 parts of 1 mol/L ammonium persulfate solution were added to establish an oxidative environment. The mixture was stirred continuously for 1 h to initiate pre-polymerization reaction.

Embodiment 5

Different from Embodiment 1:
(1) 7 parts of maleic anhydride and an appropriate amount of pure water were mixed, a temperature of the solution was increased to 50° C., and the solution was continuously stirred for 2 h to initiate a pre-polymerization reaction.

Embodiment 6

Different from Embodiment 5:
(1) 7 parts of maleic anhydride and an appropriate amount of pure water were mixed, a temperature of the solution was increased to 70° C., and the solution was continuously stirred for 2 h to initiate a pre-polymerization reaction.

Embodiment 7

Different from Embodiment 5:
(1) 7 parts of maleic anhydride and an appropriate amount of pure water were mixed, a temperature of the solution was increased to 50° C., and the solution was continuously stirred for 4 h to initiate a pre-polymerization reaction.

Embodiment 8

Different from Embodiment 1:
(1) 7 parts of phenylenediamine were mixed with an appropriate amount of pure water. The pH of the solution was adjusted to 4 with 0.5 µmol/L phosphoric acid solution. 5 parts of 1 mol/L ammonium persulfate solution were added to establish an oxidative environment. The mixture was stirred continuously for 1 h to initiate pre-polymerization reaction.

Embodiment 9

Different from Embodiment 1:
(1) 7 parts of phenylenediamine were mixed with an appropriate amount of pure water. The pH of the solution was adjusted to 4 with 0.5 µmol/L phosphoric acid solution. 12 parts of 1 mol/L ammonium persulfate solution were added to establish an oxidative environment. The mixture was stirred continuously for 1 h to initiate pre-polymerization reaction.

Embodiment 10

Different from Embodiment 1:
(2) The pre-polymerization solution, 100 parts of graphite (with an average particle size of 17 µm) and a proper amount of pure water were stirred and mixed at a solid-liquid ratio of 1:1.5 to form a uniform mixed solution, the mixture was liquid-phase coated for 12 h while stirring, the phenylenediamine in the mixed solution was polymerized, then the mixed solution was centrifuged for solid-liquid separation, and then moved to a drying oven for drying at 120° C. for 36 h to obtain a precursor.

Embodiment 11

Different from Embodiment 1:
(1) 4 parts of phenylenediamine were mixed with an appropriate amount of pure water. The pH of the solution was adjusted to 4 with 0.5 µmol/L phosphoric acid solution. 4 parts of 1 mol/L ammonium persulfate solution were added to establish an oxidative environment. The mixture was stirred continuously for 1 h to initiate pre-polymerization reaction.

Embodiment 12

Different from Embodiment 1:
(1) 25 parts of phenylenediamine were mixed with an appropriate amount of pure water. The pH of the solution was adjusted to 4 with 0.5 µmol/L phosphoric acid solution. 25 parts of 1 mol/L ammonium persulfate solution were added to establish an oxidative environment. The mixture was stirred continuously for 1 h to initiate pre-polymerization reaction.

Embodiment 13

Different from Embodiment 1:
(3) Under a nitrogen atmosphere, the precursor was heated to 1600° C. and carbonized for 4 h. Then the product was cooled naturally to room temperature, obtaining a final anode material.

Embodiment 14

Different from Embodiment 1:
(3) Under a nitrogen atmosphere, the precursor was heated to 2300° C. and carbonized for 4 h. Then the product was cooled naturally to room temperature, obtaining a final anode material.

Embodiment 15

Different from Embodiment 1:
(2) The pre-polymerization solution, 100 parts of graphite (with an average particle size of 10 μm) and a proper amount of pure water were stirred and mixed at a solid-liquid ratio of 1:3 to form a uniform mixed solution, the mixture was liquid-phase coated for 12 h while stirring, the phenylenediamine in the mixed solution was polymerized, then the mixed solution was centrifuged for solid-liquid separation, and then moved to a drying oven for drying at 120° C. for 36 h to obtain a precursor.
(3) Under a nitrogen atmosphere, the precursor was heated to 2300° C. for 4 h. Then the product was cooled naturally to room temperature, obtaining a final anode material.

Embodiment 16

Different from Embodiment 1:
(2) The pre-polymerization solution, 100 parts of graphite (with an average particle size of 6 μm) and a proper amount of pure water were stirred and mixed at a solid-liquid ratio of 1:3 to form a uniform mixed solution, the mixture was liquid-phase coated for 12 h while stirring, the phenylenediamine in the mixed solution was polymerized, then the mixed solution was centrifuged for solid-liquid separation, and then moved to a drying oven for drying at 120° C. for 36 h to obtain a precursor.
(3) Under a nitrogen atmosphere, the precursor was heated to 2300° C. for 4 h. Then the product was cooled naturally to room temperature, obtaining a final anode material.

Embodiment 17

Different from Embodiment 1:
(1) 7 parts of phenylenediamine were mixed with an appropriate amount of pure water. The pH of the solution was adjusted to 4 using 0.5 μmol/L phosphoric acid solution. 7 parts of 1 mol/L ammonium persulfate solution were added to establish an oxidative environment. The mixture was stirred continuously for 3 h to initiate pre-polymerization reaction, obtaining a pre-polymerization solution.

Comparative Embodiment 1

Different from Embodiment 1:
(2) The pre-polymerization solution, 100 parts of graphite (with an average particle size of 17 μm) and a proper amount of pure water were stirred and mixed at a solid-liquid ratio of 1:1.1 to form a uniform mixed solution, the mixture was continuously stirred and reacted for 12 h, the phenylenediamine in the mixed solution was polymerized, then the mixed solution was centrifuged for solid-liquid separation, and then moved to a drying oven for drying at 120° C. for 36 h to obtain a precursor.

Comparative Embodiment 2

Different from Embodiment 1:
(1) 0.8 parts of phenylenediamine were mixed with an appropriate amount of pure water. The pH of the mixed solution was adjusted to 4 using 0.5 μmol/L phosphoric acid solution. 0.8 parts of 1 mol/L ammonium persulfate solution were added to establish an oxidative environment. The mixture was stirred continuously for 1 h to initiate pre-polymerization reaction.
(2) The pre-polymerization solution, 100 parts of graphite (with an average particle size of 17 μm) and a proper amount of pure water were stirred and mixed at a solid-liquid ratio of 1:1.3 to form a uniform mixed solution, the mixture was continuously stirred and reacted for 12 h, the phenylenediamine in the mixed solution was polymerized, then the mixed solution was centrifuged for solid-liquid separation, and then moved to a drying oven for drying at 120° C. for 36 h to obtain a precursor.

Comparative Embodiment 3

Different from Embodiment 1:
(3) Under a nitrogen atmosphere, a precursor of the coating material was heated to 700° C. for 4 h. Then the product was cooled naturally to room temperature, obtaining a high-structure disordered carbon-coated graphite material.

Comparative Embodiment 4

Different from Embodiment 1:
(1) 7 parts of phenylenediamine were mixed with an appropriate amount of pure water. The pH of the mixed solution was adjusted to 10 using 0.5 μmol/L phosphoric acid solution. 7 parts of 1 mol/L ammonium persulfate solution were added to establish an oxidative environment. The mixture was stirred continuously for 1 h to initiate pre-polymerization reaction.

Comparative Embodiment 5

Different from Embodiment 1:
(1) 7 parts of phenylenediamine were mixed with an appropriate amount of pure water. The pH of the solution was adjusted to 4 using 0.5 μmol/L phosphoric acid solution. 7 parts of 1 mol/L ammonium persulfate solution were added to establish an oxidative environment. The mixture was stirred continuously for 6 h to initiate pre-polymerization reaction, obtaining a pre-polymerization solution.

Comparative Embodiment 6

Different from Embodiment 1:
(1) 7 parts of phenylenediamine were mixed with an appropriate amount of pure water. The pH of the solution was adjusted to 4 using 0.5 µmol/L phosphoric acid solution. 7 parts of 1 mol/L ammonium persulfate solution were added to establish an oxidative environment. The next step is directly carried out without a pre polymerization reaction.

Comparative Embodiment 7

Different from Embodiment 1:
(2) The pre-polymerization solution, 100 parts of graphite (average particle size is 17 µm), and an appropriate amount of pure water were stirred and mixed at a solid-to-liquid ratio of 1:3 to form a homogeneous mixture. The mixture was liquid-phase coated for 2 h under stirring. Polyphenylenediamine in the pre-polymerization solution was deposited and adhered to a surface of graphite particle. Then the mixture was centrifuged, and the resulting solid was dried at 120° C. for 36 h in an oven, obtaining a precursor.

Testing Method
(1) Test Method for Particle Size Distribution of Anode material: A particle size distribution range of an anode material was tested by a Markov 3000 laser particle sizer. In a 50 mL beaker, a dispersing agent (ethanol, pure water and a low foam surfactant) and a sample to be tested were placed, and a certain amount of pure water was added and fully stirred with a glass rod to disperse the sample uniformly. The device pump speed is set to be 2400 r/min to 2500 r/min, and its frequency is set to be 19.5 Hz for particle size testing.
(2) Test method of Tap Density of Anode material: The anode material is placed in a sample bin of the tap density meter, the sample volume is recorded 1000 times of vibration, and the tap density can be calculated according to a ratio of mass to volume.
(3) Test Method for Specific Surface Area of Anode material: The Specific Surface Area of the material was tested using a JWGB DX400. A sample was put into a sample tube, and an isothermal jacket was placed around the tube. A filling rod was put into a bubble tube, a clamping ring and an O-shaped ring are arranged on the bubble tube, and then the assembled sample bubble tube was put into a corresponding analysis station for testing. At constant and low temperature, after the adsorption amount of gas on a solid surface at different relative pressures was measured, the adsorption amount of the sample monomolecular layer was calculated based on the Brownian Etter Taylor adsorption theory and its formula (BET formula), and thus the specific surface area of the material was calculated.
(4) Test method for Oil Absorption Value of Anode material: The oil absorption value Q was tested by using an ASAHI S-500 oil absorption value tester of ASAHISOUKEN, Japan, and the oil absorption value Q, with a unit of mL/100 g, was the amount of flaxseed oil added dropwise when the torque generated by the viscosity characteristic change reached 70% of the maximum torque.
(5) Test Method for Surface Morphology, Cross-Section, and Coating Layer of Anode material Particles: The microstructure of the surface of the anode material was observed using a HITACHI-S4800 scanning electron microscope. The steps were as follows. A conductive adhesive was pasted on a sample cup, a sample was uniformly coated on a conductive adhesive, an ear washing ball was used for blowing away the unsecured sample, and the sample was put into a scanning electron microscope chamber for testing. The test steps of cross-section and coating layer were as follows. Firstly, a HITACHI-E3500 ion milling machine was used for polishing graphite particles, a small amount of carbon conductive adhesive was coated on the edge of a sample table, graphite sample was uniformly scattered, a glass sheet was slightly pressed, and after the conductive adhesive was dried for 2 µmin, redundant samples were blown away through the ear washing ball. A sample table was placed on a sample base, the position of the sample was adjusted, after completion, airflow was adjusted to the maximum ion beam current, and the polishing time was set for sample processing. After completion, HITACHI-S4800 scanning electron microscope was used to observe the cross-section and coating layer on the surface of the anode material.
(6) Raman Test Method for Anode material: Raman scattering spectra were tested using a HORIBA-XPLOR A-type laser confocal Raman spectrometer with a laser wavelength of 532 nm. 30 points are taken on the surface of the anode material particles for data collection respectively, the scattering spectra obtained at each point were subjected to peak fitting respectively. A ratio of the peak area of the D characteristic peak located in the range of 1300 cm$^{-1}$-1350 cm$^{-1}$ to the peak area of the G characteristic peak located in the range of 1500 cm$^{-1}$-1580 cm$^{-1}$ is $I_D/I_G$, and the average value of $I_D/I_G$ was A. After the anode material particles were subjected to cutting treatment, HITACHI-E3500 ion milling machines were used for cutting the particles, then the cutting region was tested, the cutting region refers to graphite core region. 10 points were randomly selected in the particle cutting region for Raman spectrum scanning, and an average value of the ratio of the peak area of the D characteristic peak located in the range of 1300 cm$^{-1}$-1350 cm$^{-1}$ to the peak area of the G characteristic peak located in the range of 1500 cm$^{-1}$-1580 cm$^{-1}$ is $I_D/I_G$, and the average value of $I_D/I_G$ was A.
(7) Method for Measuring Polymerization Degree of Polymer: The polymerization degree of the polymer in the prepolymer solution was tested using a gel permeation chromatograph. Gel permeation chromatography (GPC), also known as size exclusion chromatography, was performed with a solvent as the mobile phase, flowing through a porous packing material (such as porous silica or porous resin) as the separation medium. As the solvent washed through, molecules of different sizes were separated, with larger molecules being eluted first and smaller molecules being eluted later. The polymer molecular weight and its distribution were analyzed, and the polymerization degree was determined by the obtained polymer molecular weight/the molecular weight of the monomer.
(8) Test Method of Atomic Force Microscope: The surface flatness of the graphite material was tested using an atomic force microscope (AFM). One end of a micro cantilever, highly sensitive to weak forces, was fixed, and a small tip at the other end was gently brought into contact with the sample surface. Due to the extremely weak repulsive force between the atoms at the tip and the sample surface, the cantilever was deflected slightly. By detecting the deflection and controlling the repulsive force to maintain constancy, the position changes corresponding to each point on the cantilever were obtained, resulting in an image of the sample's surface topography. A random 1 μm×1 μm test area was selected from the image, and the arithmetic average of the absolute height deviation relative to the reference plane within the test area was calculated as S nm, where 15 nm≤S≤60 nm. S was determined by the equation $$S = 1/n \sum_{i=1}^{n} |Z|,$$

with n≥5, where Z is the height deviation of any test point within the test area relative to the reference plane (i.e., the vertical coordinate). In the present disclosure, a tapping mode was used. A probe vibrated at a fixed frequency along the Z-axis, and contact with the sample occurred when the vibration reached the trough. This method caused minimal damage to the sample and provided high resolution. The reference plane for the atomic force microscope in the present disclosure was determined by detecting and analyzing the interaction between the tip and the sample surface.

(9) Electrochemical Performance Test Method: Anode material prepared from the embodiments and comparative embodiments was mixed in a mass ratio of 96.5:1.5:1, consisting of anode material, carboxymethyl cellulose, and styrene-butadiene rubber, dissolved in deionized water. The solid content was controlled at 50%, and the mixture was coated onto copper foil collectors. After vacuum drying, negative electrode sheets were produced. A lithium metal sheet was used as the counter electrode, and a coin cell was assembled inside an argon-filled glove box. At a current density of 0.1 C, a charge-discharge test was performed in a charge-discharge interval of 0.01 V-1.5 V. The initial reversible specific capacity, the initial cycle charging capacity and the initial cycle discharging capacity were obtained by cyclic charging and discharging. The initial Coulombic efficiency=the initial discharging capacity/the initial charging capacity.

After the above test was completed, the charging current density was set to 0.2 C, and the discharge lithium intercalation test was performed at a current density of 0.2 C, 0.5 C, 1 C and 2 C, respectively. 2 C/0.2 C rate performance=0.2 C discharge lithium insertion capacity/2 C discharge lithium insertion capacity.

Preparation process parameters and corresponding test results of Embodiment 1 to Embodiment 17 (abbreviated as S1 to S17) and Comparative Embodiment 1 to Comparative Embodiment 7 (abbreviated as D1 to D7) prepared in the present disclosure are shown in Table 1 and Table 2 below.

TABLE 1

Preparation Process Parameters of the Anode material

| Sample | Raw Material D50 (μm) | Coating Agent | Coating Agent: Graphite Mass Ratio | Solid-Liquid Ratio | Pre-Polymerization Time (h) | Polymerization | pH | Mass ratio of redox agent to coating agent | Liqui phase coating time (h) | Carbonization Temperature (° C.) |
|---|---|---|---|---|---|---|---|---|---|---|
| S1 | 17.0 | Phenylenediamine | 7:100 | 1:3 | 1 | 5 | 4 | 1:1 | 12 | 1250 |
| S2 | 17.0 | Amino Styrene | 7:100 | 1:3 | 1 | 7 | 4 | 1:1 | 12 | 1250 |
| S3 | 17.0 | Phenylenediamine | 7:100 | 1:3 | 1 | 6 | 5 | 1:1 | 12 | 1250 |
| S4 | 17.0 | Phenylenediamine | 4:100 | 1:3 | 1 | 8 | 7 | 1:1 | 12 | 1250 |
| S5 | 17.0 | Maleic anhydride | 7:100 | 1:3 | 1 | 5 | — | — | 12 | 1250 |
| S6 | 17.0 | Maleic anhydride | 7:100 | 1:3 | 1 | 7 | — | — | 12 | 1250 |
| S7 | 17.0 | Maleic anhydride | 7:100 | 1:3 | 1 | 10 | — | — | 12 | 1250 |
| S8 | 17.0 | Phenylenediamine | 7:100 | 1:3 | 1 | 7 | 4 | 7:5 | 12 | 1250 |
| S9 | 17.0 | Phenylenediamine | 7:100 | 1:3.5 | 1 | 4 | 4 | 7:12 | 12 | 1250 |
| S10 | 17.0 | Phenylenediamine | 7:100 | 1:1.3 | 1 | 15 | 4 | 1:1 | 12 | 1250 |
| S11 | 17.0 | Phenylenediamine | 4:100 | 1:3 | 1 | 5 | 4 | 1:1 | 12 | 1250 |
| S12 | 17.0 | Phenylenediamine | 25:100 | 1:3 | 1 | 5 | 4 | 1:1 | 12 | 1250 |
| S13 | 17.0 | Phenylenediamine | 7:100 | 1:3 | 1 | 5 | 4 | 1:1 | 12 | 1600 |
| S14 | 17.0 | Phenylenediamine | 7:100 | 1:3 | 1 | 5 | 4 | 1:1 | 12 | 2300 |
| S15 | 10.0 | Phenylenediamine | 7:100 | 1:3 | 1 | 5 | 4 | 1:1 | 12 | 2300 |
| S16 | 6.0 | Phenylenediamine | 7:100 | 1:3 | 1 | 5 | 4 | 1:1 | 12 | 2300 |
| S17 | 17.0 | Phenylenediamine | 7:100 | 1:3 | 3 | 28 | 4 | 1:1 | 12 | 1250 |

TABLE 1-continued

Preparation Process Parameters of the Anode material

| Sample | Raw Material D50 (μm) | Coating Agent | Coating Agent: Graphite Mass Ratio | Solid-Liquid Ratio | Pre-Polymerization Time (h) | Polymerization | pH | Mass ratio of redox agent to coating agent | Liquid phase coating time (h) | Carbonization Temperature (°C) |
|---|---|---|---|---|---|---|---|---|---|---|
| D1 | 17.0 | Phenylenediamine | 7:100 | 1:1.1 | 1 | 5 | 4 | 1:1 | 12 | 1250 |
| D2 | 17.0 | Phenylenediamine | 0.8:100 | 1:3 | 1 | 3 | 4 | 1:1 | 12 | 1250 |
| D3 | 17.0 | Phenylenediamine | 7:100 | 1:3 | 1 | 5 | 4 | 1:1 | 12 | 700 |
| D4 | 17.0 | Phenylenediamine | 7:100 | 1:3 | 1 | 15 | 10 | 1:1 | 12 | 1250 |
| D5 | 17.0 | Phenylenediamine | 7:100 | 1:3 | 6 | 60 | 4 | 1:1 | 12 | 1250 |
| D6 | 17.0 | Phenylenediamine | 7:100 | 1:3 | 0 | — | 4 | 1:1 | 12 | 1250 |
| D7 | 17.0 | Phenylenediamine | 7:100 | 1:3 | 1 | 5 | 4 | 1:1 | 2 | 1250 |

The "—" in the table indicates no addition.

TABLE 2

Performance parameters of the anode material and the battery prepared in Embodiments and Comparative Embodiments

| Sample | D50 μm | A Value | B Value | A-B Value | S Value (nm) | Thickness of Carbon Layer (nm) | Oil absorption value mL/100 g | Tap Density (g/cm) | Specific Surface Area (m²/g) | Reversible Specific Capacity (mAh/g) | Initial Coulombic Efficiency (%) | 2C/0.2C rate (%) |
|---|---|---|---|---|---|---|---|---|---|---|---|---|
| S1 | 17.4 | 2.46 | 0.55 | 1.91 | 23.6 | 30 | 42.5 | 1.10 | 3.67 | 366.7 | 94.3 | 22.6 |
| S2 | 17.3 | 2.42 | 0.54 | 1.88 | 21.2 | 30 | 43.7 | 1.08 | 3.65 | 365.2 | 94.2 | 23.7 |
| S3 | 17.5 | 2.43 | 0.56 | 1.89 | 22.2 | 29 | 41.5 | 1.11 | 3.70 | 365.7 | 94.2 | 23.2 |
| S4 | 17.4 | 2.33 | 0.48 | 1.85 | 18.0 | 30 | 40.7 | 1.14 | 3.76 | 365.1 | 94.0 | 23.7 |
| S5 | 17.5 | 2.57 | 0.47 | 2.10 | 25.0 | 30 | 46.5 | 1.06 | 3.37 | 364.8 | 94.3 | 24.0 |
| S6 | 17.1 | 2.53 | 0.50 | 2.03 | 21.2 | 28 | 46.7 | 1.07 | 3.48 | 364.7 | 94.2 | 23.8 |
| S7 | 17.3 | 2.37 | 0.48 | 1.89 | 16.0 | 28 | 47.5 | 1.05 | 3.51 | 364.2 | 94.1 | 24.3 |
| S8 | 17.5 | 2.13 | 0.51 | 1.62 | 37.2 | 30 | 39.5 | 1.06 | 3.91 | 364.7 | 94.0 | 24.1 |
| S9 | 17.4 | 2.52 | 0.58 | 1.94 | 20.7 | 30 | 43.2 | 1.15 | 3.36 | 368.6 | 94.4 | 23.5 |
| S10 | 17.2 | 2.37 | 0.62 | 1.75 | 45.0 | 28 | 41.7 | 1.05 | 3.77 | 362.7 | 94.0 | 24.0 |
| S11 | 17.1 | 2.33 | 0.48 | 1.85 | 60.0 | 16 | 45.0 | 1.03 | 3.76 | 365.7 | 94.0 | 22.1 |
| S12 | 17.8 | 2.81 | 0.77 | 2.04 | 15.0 | 225 | 43.7 | 1.25 | 1.95 | 363.7 | 94.2 | 25.0 |
| S13 | 17.3 | 2.03 | 0.52 | 1.51 | 23.2 | 26 | 42.0 | 1.09 | 3.21 | 365.1 | 94.7 | 21.7 |
| S14 | 17.5 | 1.78 | 0.48 | 1.30 | 23.7 | 24 | 41.7 | 1.08 | 2.95 | 362.2 | 95.2 | 20.3 |
| S15 | 10.5 | 2.17 | 0.62 | 1.55 | 23.8 | 32 | 46.2 | 1.11 | 3.35 | 364.1 | 95.0 | 24.9 |
| S16 | 6.6 | 2.36 | 0.73 | 1.63 | 21.9 | 35 | 47.5 | 1.15 | 3.67 | 364.8 | 94.6 | 25.7 |
| S17 | 17.2 | 2.15 | 0.47 | 1.68 | 18.0 | 30 | 43.5 | 1.04 | 3.95 | 365.0 | 94.0 | 23.7 |
| D1 | 17.4 | 3.25 | 0.49 | 2.76 | 75.2 | — | 48.0 | 1.03 | 8.65 | 367.0 | 92.3 | 17.5 |
| D2 | 17.0 | 1.35 | 0.55 | 0.80 | 127.0 | 2 | 53.9 | 0.87 | 7.87 | 361.8 | 89.7 | 16.8 |
| D3 | 17.6 | 3.45 | 1.30 | 2.15 | 25.7 | 35 | 48.7 | 1.15 | 6.31 | 368.8 | 87.2 | 19.7 |
| D4 | 17.2 | 1.65 | 0.43 | 1.22 | 12.4 | 30 | 49.0 | 1.01 | 3.73 | 363.8 | 93.7 | 18.0 |
| D5 | 17.3 | 1.60 | 0.54 | 1.06 | 24.7 | 30 | 43.0 | 1.00 | 3.45 | 361.7 | 93.5 | 18.3 |
| D6 | 17.1 | 1.62 | 0.45 | 1.17 | 185.6 | 20 | 48.0 | 1.04 | 4.10 | 362.1 | 93.4 | 17.1 |
| D7 | 17.7 | 3.12 | 0.61 | 2.51 | 207.6 | — | 51.7 | 0.95 | 5.37 | 361.8 | 88.9 | 16.5 |

According to the anode material provided by the present disclosure, by pre-polymerizing the coating agent with the active group, the polymerization degree of polymer in the obtained pre-polymerization solution is within the range of 3-30. The polymer is mainly an oligomer, with small molecular chain, and can be uniformly dispersed in the pre-polymerization solution. Graphite is added to the pre polymerization solution for liquid-phase coating. In the coating process, the polymer uniformly dispersed in the pre polymerization solution can deposit and adhere to the surface of graphite particles, to form a uniform polymer coating layer. Meanwhile, by controlling the solid-liquid ratio of the graphite to the pre-polymerization solution to be 1:(1.3 to 3.5) and controlling the mass ratio of the graphite to the coating agent to be 100:(4 to 30), the thickness of the polymer coating layer uniformly attached to the surface of the graphite is within a proper range, which not only increases the capacity of the anode material but also enhances the lithium ion interface transport efficiency of the anode material.

Finally, through carbonization treatment, the polymer coating layer can be fully carbonized to form a carbon layer, the disordered degree of the carbon material in the carbon layer is high, the difference in the Raman ratio of the surface of the anode material particle to the interior of the anode material particle can also be within a suitable range. In addition, the flatness of the anode material surface coating can also be within an appropriate range.

The anode material provided by the present disclosure not only improves the regularity of the graphite structure inside the anode material particles, but also provides better transmission power at the interface between graphite and carbon layer, and improves the infiltration of the contact interface between the surface of anode material and the electrolyte. The anode material prepared by method in the present disclosure has an A-B value greater than 1.22 and less than or equal to 2.10, at this time, the anode material can have excellent lithium ion transmission performance and high capacity. S is in the range of 15 nm to 60 nm, indicating that the surface coating layer of the material is uniformly distributed on the surface of the graphite particles, and the flatness of the coating layer is also in an appropriate range, which helps to infiltrate the electrolyte and reduce the interfacial impedance. According to the graphite anode material provided by the present disclosure, the regularity of the graphite structure located in the particles is ensured, the graphite and carbon layer connection interface can also have better transmission power, the infiltration of the contact interface between the surface of the anode material and the electrolyte is improved, and the provided anode material can have excellent lithium ion transmission power performance, capacity, initial Coulombic efficiency and cycle performance.

Figure 3A:
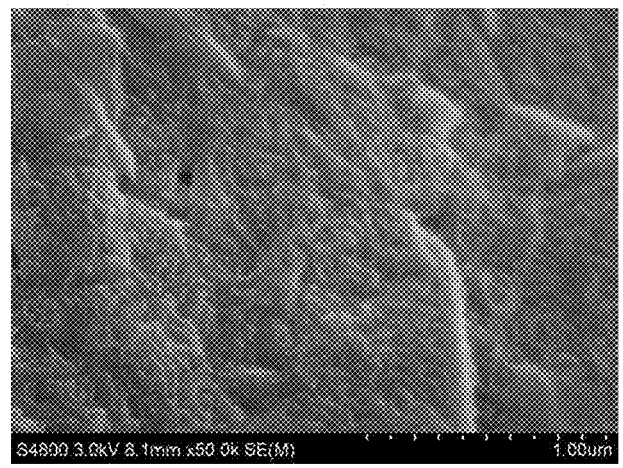
FIGS. 3A and 3B are electron micrographs of an anode material prepared in Embodiment 1 of the present disclosure at different rates, respectively.
Figure 3B:
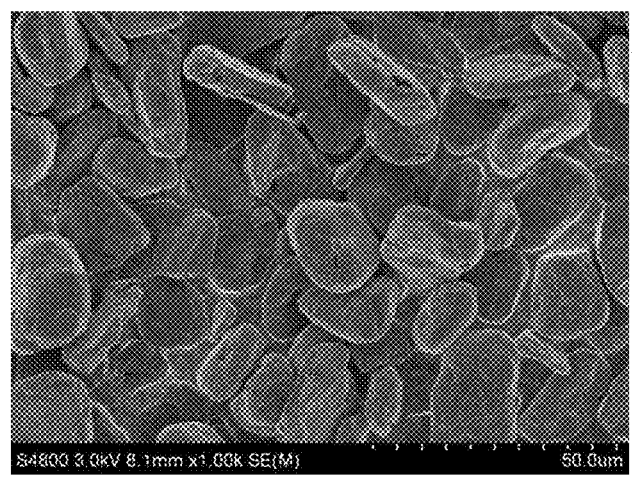
Figure 3C:
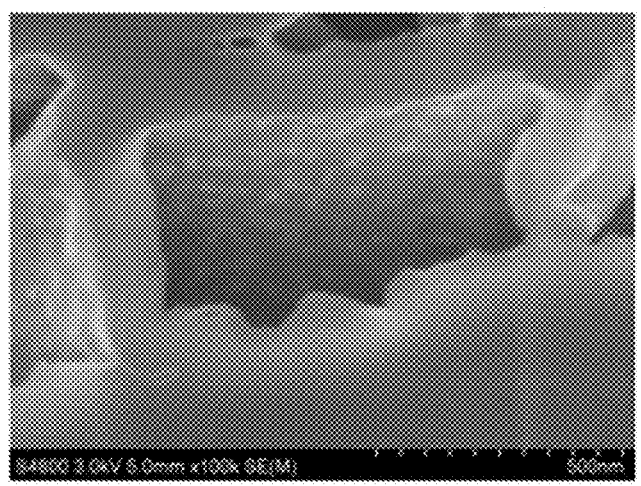
FIG. 3C is a cross-sectional electron micrograph of the anode material prepared in Embodiment 1 of the present disclosure.
Figure 4A:
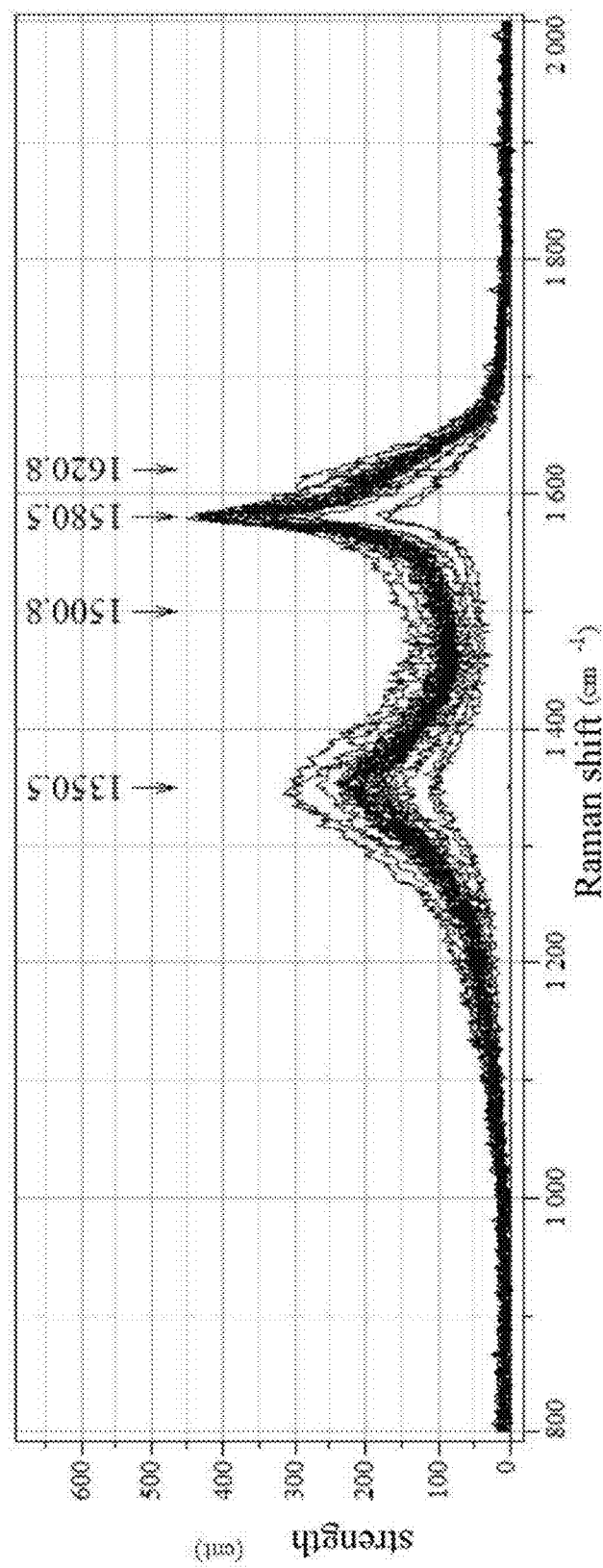
FIG. 4A is a Raman test spectrum of a material particle prepared in Embodiment 1 of the present disclosure.
Figure 4B:
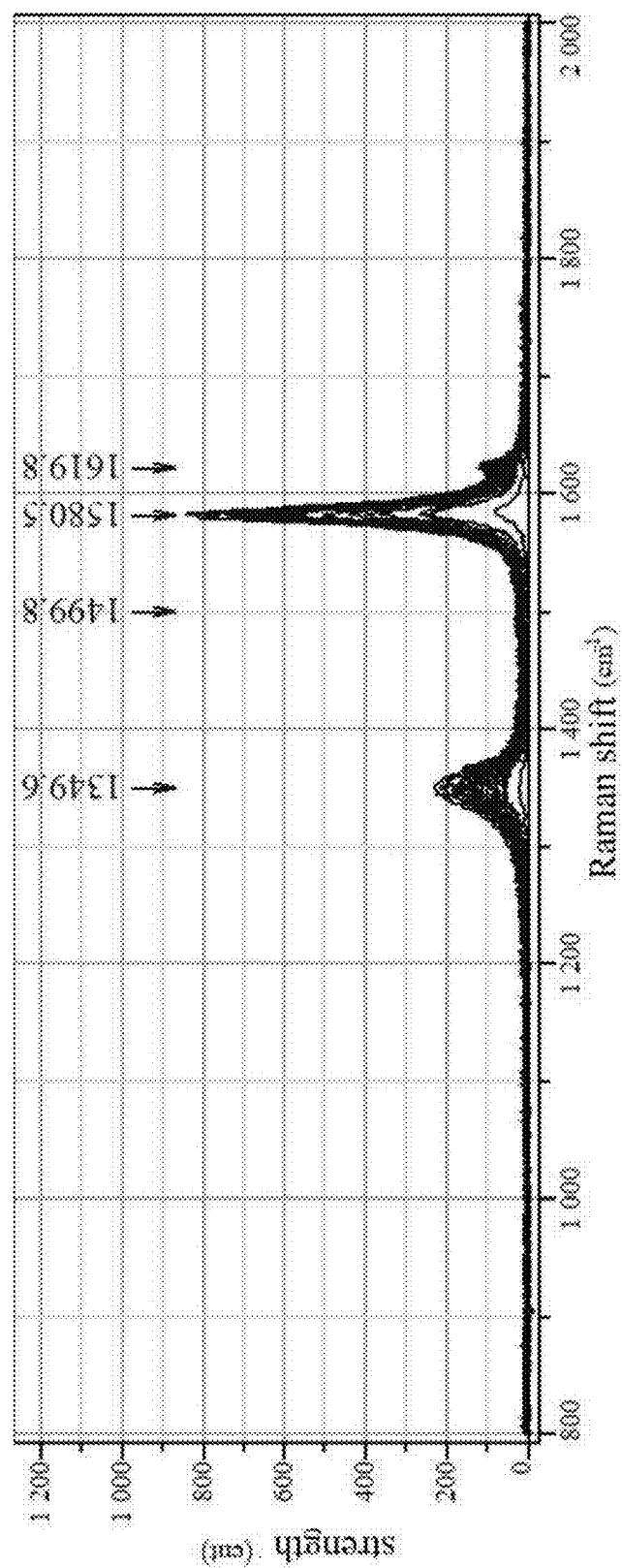
FIG. 4B is a Raman test spectrum of a material section prepared in Embodiment 1 of the present disclosure.
Figure 5:
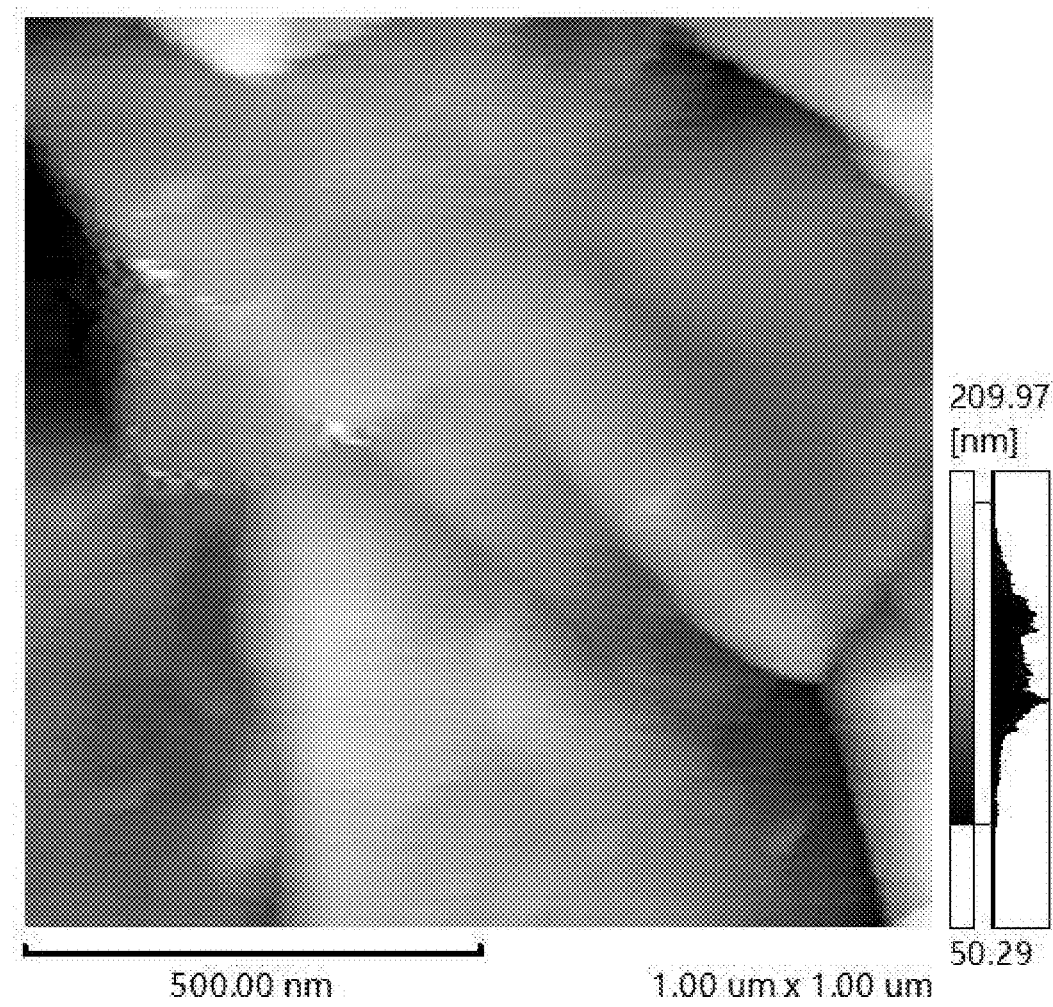
FIG. 5 is a surface atomic force microscope image of the material prepared in Embodiment 1 of the present disclosure.
Figure 6:
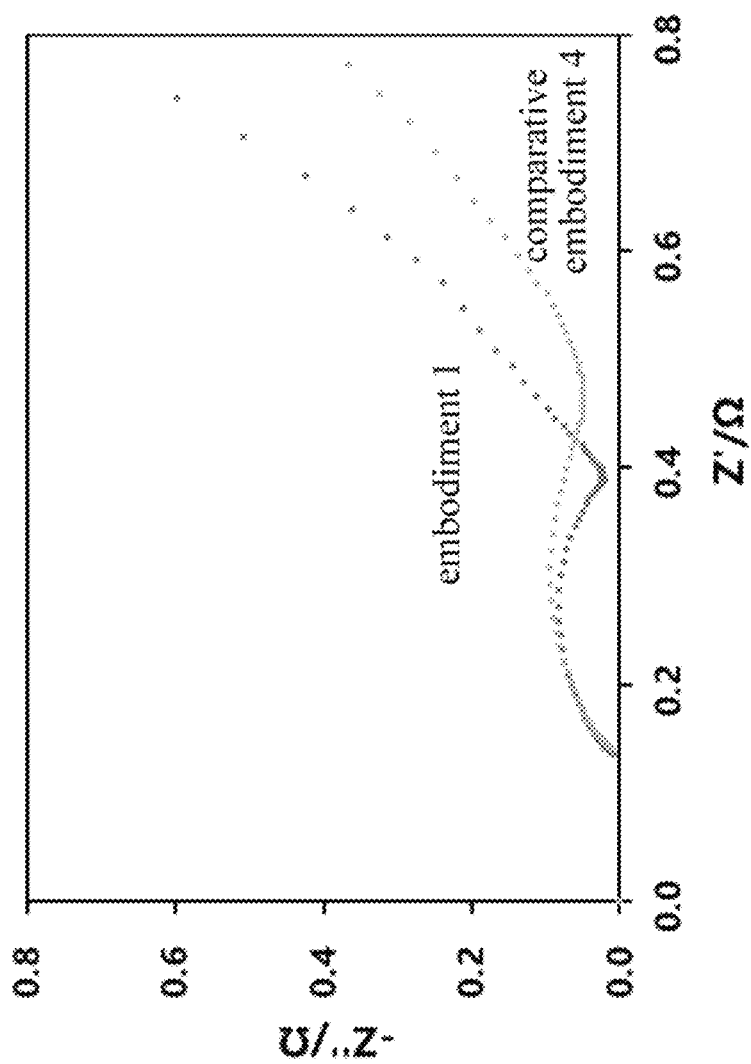
FIG. 6 is an electrochemical impedance comparison diagram of anode materials prepared in Embodiment 1 and Comparative Embodiment 4 of the present disclosure.

FIGS. 3A and 3B are electron micrographs of an anode material prepared in Embodiment 1 of the present disclosure at different rates, respectively. As shown in FIG. 3A, the carbon material in the carbon layer is uniformly distributed on the surfaces of the graphite particles in a moss shape. As shown in FIG. 3B, the whole anode material is in a potato particle distribution, and there is almost no carbon material agglomeration block with a high disorder degree among the anode material particles, indicating that the graphite material obtained by using the preparation method of the present disclosure uniformly coats the carbon material with a high disorder degree. As shown in FIG. 3C, the anode material is cut, and the carbon material with a high moss disorder degree can also be observed on the surface of the exposed graphite sheet inside, and has the same morphology as the outer surface of the anode material (FIG. 3A), indicating that the preparation method provided by the present disclosure can achieve uniform coating of the carbon material with a high disorder degree outside the graphite particles. FIG. 4A and FIG. 4B are Raman spectra of the graphite anode material and the section prepared in Embodiment 1 of the present disclosure. In combination with the data in Table 2, it can be found that the Raman ratio of the graphite material is 2.46, the Raman ratio of the section is 0.55, the corresponding A-B value is 1.91 with a range of 1.22-2.10. FIG. 5 is an atomic force microscope image of the graphite anode material prepared in Embodiment 1, the corresponding S value is 23.6 nm, and the capacity, initial efficiency and rate performance of the anode material prepared in Embodiment 1 are significantly improved.

According to the test data of Embodiments 1 to 2 and Embodiment 5, it can be seen that the A value and the A-B value of the prepared anode material are not changed greatly by using different coating agents with active groups. Meanwhile, the S value of the anode material is in the range of 15 nm to 60 nm, and the specific capacity, the initial Coulombic efficiency and the rate performance of the anode material are good.

According to the test data of Embodiment 1 and Embodiments 3 to 4, it can be seen that with the increase of the pH value, the A value of the prepared anode material is gradually decreased, the corresponding A-B value is also gradually decreased, and the S value is also gradually decreased, indicating that the pH will affect the degree of polymerization of the polymer in the pre-polymerization solution, so that the disorder of the carbon material in the carbon layer is slightly decreased, the surface flatness of the material is slightly increased, the capacity and the initial Coulombic efficiency of the anode material are decreased, and the rate performance change is not large.

According to the test data of Embodiments 5 to 7, it can be seen that when the coating agent is a coating agent having carbon-carbon double bonds, the A value of the prepared anode material is reduced along with the increase of the pre-polymerization temperature. The A value of the prepared anode material is also reduced along with the extension of the heat preservation time. This is because the pre-polymerization temperature and the heat preservation time affect the degree of polymerization of the polymer formed by polymerization in the pre-polymerization solution, the molecular chain of the polymer is increased, and then the degree of disorder of the carbon layer on the surface of the anode material is affected, and the capacity and the initial Coulombic efficiency of the anode material are improved within the pre-polymerization temperature range and the heat preservation time range of the present disclosure.

According to the test data of Embodiment 1 and Embodiments 8 and 9, it can be seen that as the addition amount of the redox agent increases, the degree of polymerization of the polymer in the pre-polymerization solution gradually increases, the degree of disorder of the polymer deposited on the surface of the graphite particles gradually decreases, the A value of the anode material prepared after carbonization also decreases, A-B also decreases, and S also decreases gradually.

According to the test data of Embodiment 1 and Embodiment 10, it can be seen that in the stirring reaction process of graphite and the pre-polymerization solution, the concentration of polymer molecules in the pre-polymerization solution per unit volume can be controlled within a suitable interval, the concentration is reduced, and the deposition uniformity of polymer molecules on graphite particles is reduced. As the solid-liquid ratio decreases, the A value of the anode material gradually decreases, A-B also decreases, and the S value increases significantly.

According to the test data of Embodiment 1 and Embodiments 11 to 12, it can be seen that the mass ratio of the coating agent to the graphite is increased, the addition amount of the coating agent is gradually increased, the thickness of the polymer coating layer deposited on the graphite surface is increased, the A value of the prepared anode material is gradually increased, the corresponding A-B is also gradually increased, and the S value is significantly reduced.

According to the test data of Embodiment 1 and Embodiments 13 to 14, it can be seen that as the carbonization temperature increases, the degree of disorder of the polymer carbonization layer deposited on the graphite surface gradually decreases, the A value of the prepared anode material gradually decreases, and the corresponding A-B also gradually decreases, and the S value does not change greatly.

According to the test data of Embodiments 14 to 16, it can be seen that with the change of the particle size of the raw material, the thickness of the polymer layer deposited on the surface of the graphite gradually increases, the thickness of the corresponding coating layer gradually increases, the A value and the corresponding A-B of the carbonized material gradually increase, and the S value does not change greatly. The preparation method provided by the present disclosure is suitable for preparation of graphite materials with different particle sizes and high surface disorder characteristics.

According to the test data of Embodiment 1 and Embodiment 17, it can be seen that as the pre-polymerization time is prolonged, the degree of polymerization of the polymer in the pre-polymerization solution is increased, the degree of disorder of the polymer carbide layer deposited on the corresponding graphite surface is decreased, the A value of the prepared anode material is gradually decreased, the corresponding A-B is also gradually decreased, and the S value is decreased.

Compared with Embodiment 1, in the preparation process of Comparative Embodiment 1, the solid-liquid ratio of graphite and the pre-polymerization solution is too high, the deposition reaction of the polymer in the pre-polymerization solution on the graphite particles is uneven, the polymer has self-nucleation growth and agglomeration phenomena, the Raman value of the prepared anode material is A, and A>3.00, A-B>2.10, S>60.0 nm. The specific surface area corresponding to the anode material is too high, and the initial Coulombic efficiency and rate are obviously reduced.

Compared with Embodiment 1, in the preparation process of Comparative Embodiment 2, the addition amount of the coating agent is too low, the concentration of the polymer in the pre-polymerization solution is also reduced, the polymer is difficult to deposit on the graphite particles to form a uniform coating layer. The Raman value of the prepared anode material is A, and A<1.70, A-B<1.22, S>60.0 nm. The specific surface area of the anode material is increased, and the capacity, the initial efficiency and the rate of the anode material are also reduced.

Compared with Embodiment 1, in the preparation process of Comparative Embodiment 3, the carbonization temperature is too low, the disordered degree of the carbon layer coated outside the graphite particles is too high, the defects inside the graphite particles are also synchronously increased, the Raman value A of the prepared high-structure disordered carbon-coated graphite material is greater than 3.00, the A-B is 1.22 which is out of the range, the S value is slightly increased compared with Embodiment 1, the specific surface area of the anode material is too high, and the initial efficiency is reduced.

Compared with Embodiment 1, in the preparation process of Comparative Embodiment 4, the pH value is higher when the pre-polymerization solution is formed, the degree of polymerization of the polymer in the pre-polymerization solution is increased, resulting in a decrease in the degree of disorder of the carbon layer coated outside the graphite particles, the Raman value of the prepared anode material is A, and A<1.70, A-B is 1.22 which is out of the range, S<15 nm, the specific surface area of the anode material is higher, the initial efficiency and the rate are reduced.

Compared with Embodiment 1, in the preparation process of Comparative Embodiment 5, the pre-polymerization stirring time is controlled to be too long, the polymerization degree of the polymer in the pre-polymerization solution is increased, resulting in a decrease in the disorder of the graphite particle externally coated carbon layer. The Raman value of the prepared anode material is A, and A<1.70, A-B<1.22, and the S value is in the range of 15 nm to 60 nm. The capacity, the initial efficiency and the rate of the anode material are reduced.

Compared with Embodiment 1, in the preparation process of Comparative Embodiment 6, no pre-polymerization treatment is performed, resulting in incomplete deposition of the coating agent on the surfaces of the graphite particles, the thickness of the coating layer was reduced under the same coating amount. The Raman value of the prepared anode material is A, and A<1.70, A-B<1.22, S>60.0 nm. The specific surface area of the anode material is increased. The side reaction between the anode material and the electrolyte is exacerbated. The capacity, initial efficiency and rate of the anode material are reduced.

Compared with Embodiment 1, in the preparation process of Comparative Embodiment 7, after adding graphite powder, the stirring time is too short, resulting in that the coating agent is not uniformly distributed on the surfaces of the graphite particles, the Raman value A of the prepared anode material is greater than 3.00, A-B is greater than 2.10, S is greater than 60.0 nm. The specific surface area of the anode material is increased. The side reaction between the anode material and the electrolyte is exacerbated. The capacity, the initial efficiency and the rate of the anode material are reduced.

Although the present disclosure is disclosed above in terms of preferred embodiments, but not intended to limit the claims. Any of those skilled in the art can make several possible changes and modifications without departing from the concept of the present disclosure, so the protection scope of the present disclosure should be defined by the claims of the present disclosure.

What is claimed is:

1. An anode material for a lithium ion battery comprising graphite and a carbon layer located on at least part of a surface of the graphite; wherein the carbon layer comprises amorphous carbon, and a thickness of the carbon layer is 15 nm to 250 nm;

wherein, when a particle surface and a particle section of the anode material are respectively tested by Raman spectroscopy, a peak area ratio of D characteristic peak within a range of 1300 cm$^{-1}$ to 1350 cm$^{-1}$ to G characteristic peak within a range of 1500 cm$^{-1}$ to 1580 cm$^{-1}$ is $I_D/I_G$, a ratio of $I_D/I_G$ measured on the particle surface of the anode material is A, and a ratio of $I_D/I_G$ measured on the particle section of the anode material is B, where $1.70 \leq A \leq 3.00$, $0.47 \leq B \leq 0.8$, and $1.22 < A-B \leq 2.10$; and wherein, when the particle surface of the anode material is tested by an atomic force microscopy, and a 1 μm×1 μm test region is randomly selected on the particle surface of the anode material, an arithmetic average value of height deviation absolute values relative to a reference surface in the test region is S nm, where 15 nm≤S≤60 nm, $S = 1/n \ \Sigma_{i=1}^{n} |Z|$, n≥5, n≥5, and Z is a height deviation value of any test point in the test region relative to the reference surface;

wherein a median particle size of the anode material is 4 μm to 25 μm, and a specific surface area of the anode material is ≤6 μm$^2$/g.

2. The anode material for the lithium ion battery according to claim 1, wherein the anode material satisfies at least one of following features:
   1) the graphite comprises at least one of artificial graphite, natural graphite and microcrystalline graphite;
   2) a fixed carbon content of the graphite is ≥95%.

3. The anode material for the lithium ion battery according to claim 1, wherein a tap density of the anode material is in a range of 0.75 g/cm$^3$ to 1.3 g/cm$^3$.

4. The anode material for the lithium ion battery according to claim 1, wherein an oil absorption value of the anode material is in a range of 38 mL/100 g to 48 mL/100 g.

5. A lithium ion battery comprising the anode material for the lithium ion battery according to claim 1.

6. A method for preparing the anode material for the lithium ion battery according to claim 1, comprising following steps:

dispersing a coating agent with an active group and a reaction regulator in an aqueous solution, and performing a pre-polymerization reaction to obtain a pre-polymerization solution, wherein a polymerization degree of a polymer in the pre-polymerization solution is 3 to 30;

adding graphite into the pre-polymerization solution for liquid phase coating, and performing solid-liquid separation to obtain a precursor, wherein a solid-liquid ratio of the graphite to the pre-polymerization solution is 1:(1.3 to 3.5), and a mass ratio of the graphite to the coating agent is 100:(4 to 30); and carbonizing the precursor to obtain an anode material.

7. The method for preparing the anode material for the lithium ion battery according to claim 6, wherein the method satisfies at least one of following features:
   (1) the active group comprises at least one of a carbon-carbon double bond, a carboxyl group, a hydroxyl group and an amine group;
   (2) the reaction regulator comprises at least one of a redox agent and a pH regulator;
   (3) the reaction regulator comprises a redox agent, and a mass ratio of the redox agent to the coating agent is 1:(0.7 to 2.0);
   (4) the pre-polymerization reaction is performed for 1 h to 4 h;
   (5) the liquid phase coating is performed for 4 h to 24 h; and
   (6) the coating agent with the active group comprises at least one of styrene, fluorostyrene, bromostyrene, aminostyrene, phenylacetic acid, phenylpropionic acid, aniline, phenylenediamine, acrylic acid, methyl acrylate, ethyl acrylate, phenyl acrylate, benzyl acrylate, acrylamide, methylacrylamide, ethylacrylamide, phenylacrylamide, maleic acid, maleic anhydride, maleic diamine, citric acid, mesaconic acid, itaconic acid, itaconic anhydride, sulfamic acid, ammonium sulfamate, benzoic acid, ammonium benzoate, and p-fluorobenzoic acid.

8. The method for preparing the anode material for the lithium ion battery according to claim 6, wherein the method satisfies at least one of the following features:
   (1) a temperature of the carbonization treatment is 1000° C. to 2300° C.;
   (2) a heat preservation time of the carbonization treatment is 0.5 h to 6 h; and
   (3) the carbonization treatment is performed under a protective atmosphere.

* * * * *